United States Patent [19]

Hansen et al.

[11] Patent Number: 5,812,945
[45] Date of Patent: Sep. 22, 1998

[54] METERED PAYMENT CELLULAR TELEPHONE COMMUNICATION SYSTEM

[75] Inventors: Gary G. Hansen, West Redding; David W. Riley, Easton; David K. Lee, Monroe; Frederick W. Ryan, Jr., Oxford; Nathan Rosenberg, Orange; Anthony F. Violante, Stratford; Ronald P. Sansone, Weston, all of Conn.

[73] Assignee: Pitney Bowes Inc., Stamford, Conn.

[21] Appl. No.: 575,782

[22] Filed: Dec. 22, 1995

[51] Int. Cl.⁶ ........................................... H04Q 7/24
[52] U.S. Cl. ..................... 455/403; 455/408; 455/406; 455/407; 455/405
[58] Field of Search .................... 455/408, 406, 455/407, 462, 405; 379/114, 113, 112, 115

[56] References Cited

U.S. PATENT DOCUMENTS

| | | |
|---|---|---|
| 3,255,439 | 6/1966 | Simjian . |
| 3,428,948 | 2/1969 | Simjian . |
| 3,501,744 | 3/1970 | Simjian . |
| 3,716,698 | 2/1973 | Simjian . |
| 3,792,446 | 2/1974 | McFiggins et al. . |
| 3,890,599 | 6/1975 | Simjian . |
| 3,977,222 | 8/1976 | Luperti et al. . |
| 3,998,079 | 12/1976 | Uthenwoldt . |
| 4,097,923 | 6/1978 | Eckert, Jr. . |
| 4,122,532 | 10/1978 | Dlugos et al. . |
| 4,138,735 | 2/1979 | Allocca et al. . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,258,252 | 3/1981 | Simjian . |
| 4,268,817 | 5/1981 | Simjian . |
| 4,317,028 | 2/1982 | Simjian . |
| 4,376,299 | 3/1983 | Rivest . |
| 4,436,992 | 3/1984 | Simjian . |
| 4,447,890 | 5/1984 | Duwel et al. . |
| 4,787,045 | 11/1988 | Storace et al. . |
| 4,811,234 | 3/1989 | Storace . |
| 4,812,992 | 3/1989 | Storace . |
| 4,827,508 | 5/1989 | Shear . |
| 4,864,506 | 9/1989 | Storace . |
| 4,977,594 | 12/1990 | Shear . |
| 5,010,571 | 4/1991 | Katznelson . |
| 5,050,213 | 9/1991 | Shear . |
| 5,051,564 | 9/1991 | Schmidt . |
| 5,058,025 | 10/1991 | Haines et al. . |
| 5,077,660 | 12/1991 | Haines . |
| 5,136,648 | 8/1992 | Olson et al. . |
| 5,224,046 | 6/1993 | Kim et al. . |
| 5,233,531 | 8/1993 | Schulz . |
| 5,237,506 | 8/1993 | Horbal et al. . |
| 5,239,294 | 8/1993 | Flanders et al. . |
| 5,243,654 | 9/1993 | Hunter . |
| 5,247,575 | 9/1993 | Sprague et al. . |
| 5,282,250 | 1/1994 | Dent et al. . |
| 5,291,543 | 3/1994 | Freese et al. . |
| 5,301,223 | 4/1994 | Amadon et al. . |
| 5,301,234 | 4/1994 | Mazziotto et al. . |
| 5,309,363 | 5/1994 | Graves et al. . |
| 5,309,501 | 5/1994 | Kozik et al. . |
| 5,319,705 | 6/1994 | Halter et al. . |
| 5,325,418 | 6/1994 | McGregor et al. . |
| 5,329,573 | 7/1994 | Chang et al. . |
| 5,335,278 | 8/1994 | Matchett et al. . |
| 5,369,401 | 11/1994 | Haines . |
| 5,377,264 | 12/1994 | Lee et al. . |
| 5,377,267 | 12/1994 | Suzuki et al. . |
| 5,377,268 | 12/1994 | Hunter . |
| 5,394,469 | 2/1995 | Nagel et al. . |

*Primary Examiner*—Dwayne D. Bost
*Assistant Examiner*—Keith Ferguson
*Attorney, Agent, or Firm*—Ronald Reichman; Melvin J. Scolnick; Robert Meyer

[57] ABSTRACT

This invention overcomes the disadvantages of the prior art by providing a cellular telephone metering systems that allows phone calls to be made as long as sufficient funds or call units reside in the phone. The apparatus of this invention also utilize encryption and employ seed numbers for the addition of funds or call units to the cellular phone.

10 Claims, 11 Drawing Sheets

METERED PAYMENT CELLULAR TELEPHONE COMMUNICATION SYSTEM

CROSS REFERENCE TO RELATED APPLICATIONS

Reference is made to commonly assigned patent application Docket No. E-349 filed herewith entitled "Authorized Cellular Telephone Communication Access And Verification Control System" in the names of Anthony F. Violante and Ronald P. Sansone and Docket No. E432 filed herewith entitled "Authorized Cellular Voice Messaging And/Or Analog or Digital Data Communication Access And Verification Control System" in the names of Ronald P. Sansone and Anthony F. Violante; Docket No. E-434 filed herewith entitled "Cellular telephone Manifest System" in the names of Ronald P. Sansone and Anthony F. Violante; and Docket No. E-470 filed herewith entitled "A Method For Communicating With A Voice Response Unit Over A Cellular Telephone Network" in the names of Steve Kovlakas, Steven Vasquez, Jean-Hiram Coffy and Michael Wilson.

FIELD OF THE INVENTION

The invention relates generally to the field of telecommunications systems and more particularly to metered payment cellular telecommunications systems.

BACKGROUND OF THE INVENTION

Cellular mobile radio or cellular communications systems have been developed for mobile communications. Typically, the planned service area is divided into a number of geographical areas or cells. The available frequency channels for the service area are divided among the cells. A cellular telephone for example communicates with a nearby cell base station via one of the several radio frequency channels assigned to the cell. Conventional circuits link the base station to the mobile telecommunications switching office, which switches calls between the cellular telephone system and the rest of the telephone network.

Currently cellular telephone users are paying for their phone calls by each phone call billed to their account. The foregoing is accomplished by the use of a central billing system. The central billing system logs each individual call and uses one or more of the following to determine the charge for the call: The duration of the call, the distance of the call, the origination point of the call, method of payment and time of day, etc.

The central billing system accumulates the call data, including the charges for each cellular telephone account. Periodically a bill is sent to the entity responsible for the cellular account. When payment is received, the account is deemed current.

A problem with the foregoing payment method is the management of past due accounts. Currently cellular telephone companies are losing large amounts of money due to delinquent account and unpaid bills.

As a result of the foregoing, potential cellular telephone customers that are deemed high credit risks are denied access to the cellular network.

Another problem of the prior art is that the possessor (teenager or salesman) of the cellular telephone may continuously use the phone and accumulate charges that exceed an amount desired by the owner (parent or employee) of the cellular account.

SUMMARY OF THE INVENTION

This invention overcomes the disadvantages of the prior art by providing cellular telecommunications systems that provide for the prepayment of cellular telephone usage.

The apparatus of this invention may meter payment by the number of calls, by the number of units; time; distance; or flat rate or by the amount of funds (dollars, marks, pounds, etc.) to be stored within the secured metering device. The foregoing permits the owner of the cellular account to control the maximum expenditures of the possessor of the cellular telephone. This invention also enables the telephone companies to place cellular telephones in high risk accounts by synchronizing the amount of money given to the telephone company with the value of the cellular phone calls made. Thus, no management of bad debts and delinquent accounts are required.

DETAILED DESCRIPTION OF THE PREFERRED EMBODIMENT

Figure 1:
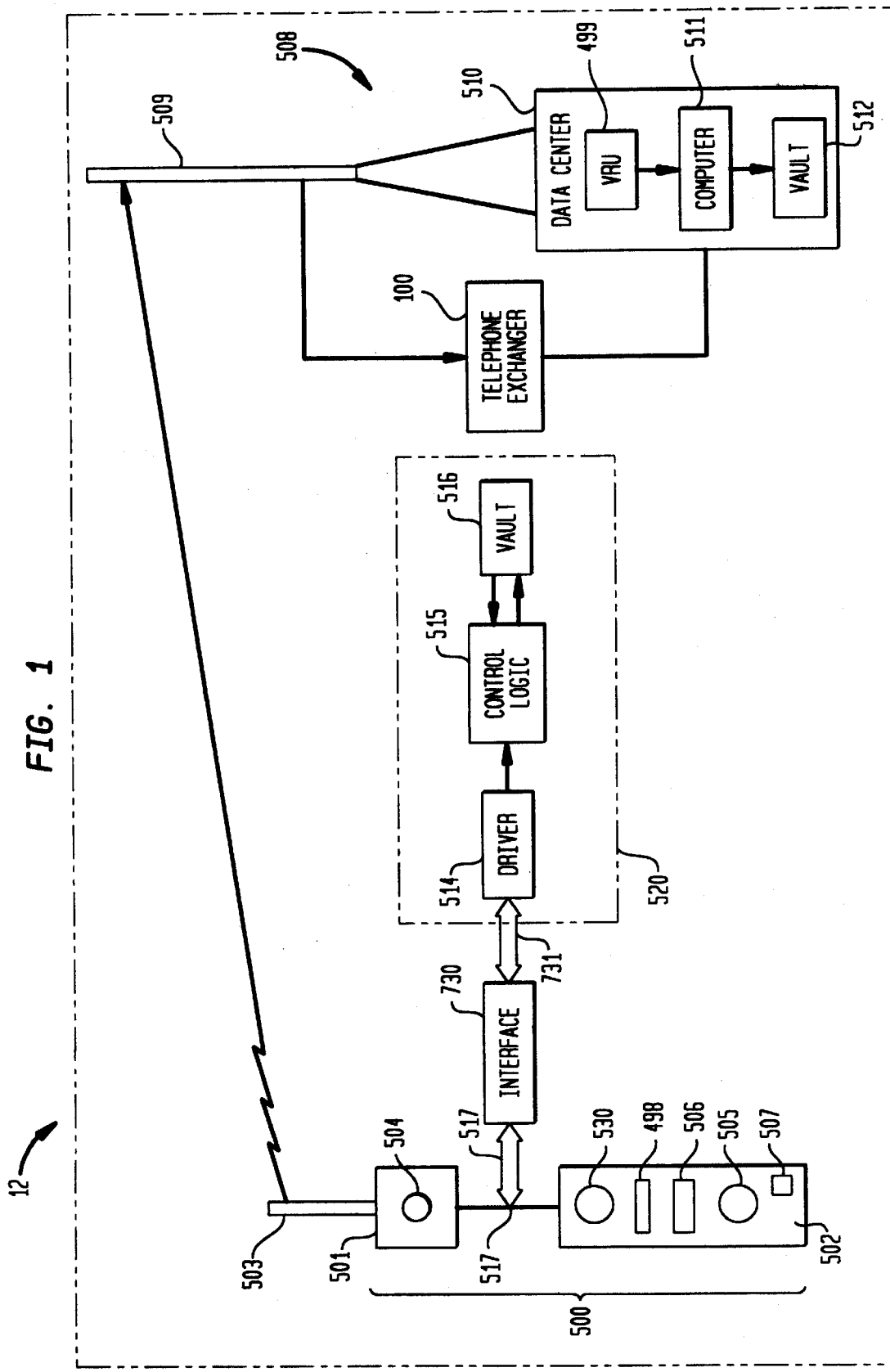
FIG. 1 is a drawing of the cellular telecommunications network of this invention.

Referring now to the drawings in detail and more particularly to FIG. 1, the reference character 12 represents the cellular telecommunications network of this invention. Network 12 includes: a cellular telephone 500, that has a radio portion 501 and a handset portion 502; a base station 508, that includes an antenna 509 and a data center 510 that includes a voice response unit 499, a computer 511 and a vault 512; and a telephone exchange 100. Radio 501 has an antenna 503 and speaker 504. Handset portion 502 has a mouthpiece 505, a keypad 506, a display 498, a speaker 530 and a power switch 507. Radio portion 501 is connected to handset portion 502 by a plurality of bi-directional wires 517. Wires 517 are connected to the input of interface 730 and wires 731 are coupled from the output of interface 730 to the input of driver 514. Interface 730 acts as a handshake to make the signals on wires 517 compatible with the signals processed by microprocessor 520. Driver 514 is coupled to control logic 515 and control logic 515 is connected to vault 516.

Driver 514 is a computer program that resides in microprocessor 520. Driver 514 decodes the information that is entered into handset portion 502 via keypad 506 and transforms the entered information into a 16 bit command word. It would be obvious to one skilled in the art that different numbers of bits may be used for the command word depending upon the amount of information that is being conveyed. The operation of driver 514 will be more fully described in the description of FIGS. 2A and 2B.

Control logic 515 is a computer program that resides in microprocessor 520. Logic 515 takes action on the items it monitors and controls the management of funds entered into vault 516. Control logic 515 uses the information provided by driver 514 for call and vault management. Call management pertains to: deciding what telephone numbers are dialed; preventing the completion of telephone calls when there is not sufficient funds in vault 516; and the allowing of certain "free" emergency calls. Vault management refers to: decrementing vault 516 on a time and rate basics during a telephone call; initiating an algorithm contained in voice response unit 499 during the vault refill process; and displaying the remaining funds contained in vault 516. The operation of control logic 515 will be more fully described in the description of FIGS. 3A–3F.

Vaults 512 and 516 contain registers and information needed to track the use of cellular telephone 500. Vaults 512 and 516 contains: ascending registers; descending registers; a control sum (which is the sum of the ascending and descending registers); and encryption logic (which is in the form of a program code). Vault 516 uses seeds that are embedded in the vault at the time of the vaults manufacture. The seeds in vault 516 are in plain text. Vault 512 uses seeds that are encoded and decoded in vault 512 prior to the seeds being used for encryption. The new seeds generated by vault 512 must then be encrypted before they are returned to computer 511. The aforementioned seeds are used to insure that the information contained in vault 512 matches the information contained in vault 516. The currently used seed will also be used to generate new seeds for vaults 512 and 516 for the next refill. The operation of vaults 512 and 516 will be more fully described in the description of FIGS. 4A, 4B AND 5.

When someone would want to place a telephone call on telecommunications network 12, they would activate power switch 507 and enter the telephone number they wish to call on keypad 506. Driver 514 and control logic 515 will process the call and cellular telephone 500 will transmit a signal via antenna 503. The aforementioned signal is received by antenna 509 and processed by data center 510 and connected to telephone exchange 100.

Figure 2A:
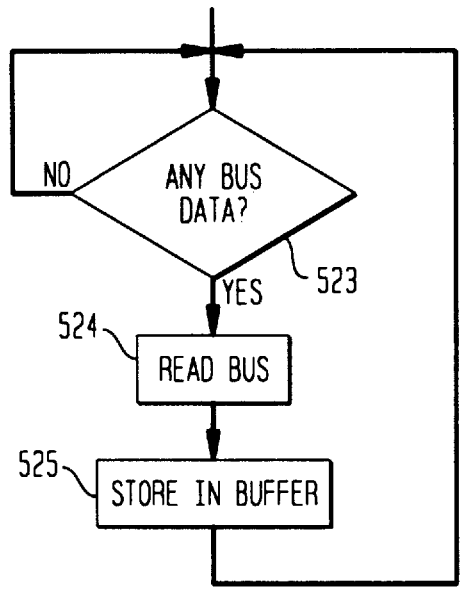
FIGS. 2A and 2B is a flow chart of driver 514.
Figure 2B:
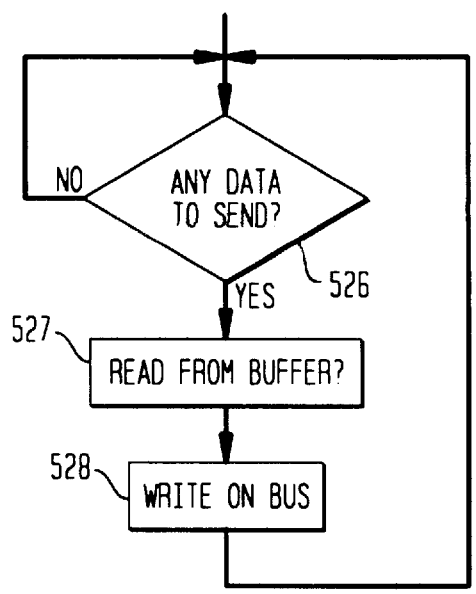

FIGS. 2A and 2B are flow chart illustrating the operation of driver 514. FIG. 2A illustrates the flow of information from radio 501 or handset 502 to microprocessor 520 via driver 514. In block 523 the program determines whether or not any information is being transmitted on wires 517. If, no information is being transmitted on wires 517, the program waits in block 523. If, information is being transmitted on wires 517, the program proceeds to read bus block 524, where the program reads the information being transmitted on wires 517. After reading the information being transmitted on wires 517, the program goes to block 525 in order to store the read information in a buffer. Then, the program goes back to block 523 and waits for the transmission of information on wires 517.

FIG. 2B illustrates the flow of information from microprocessor 520 to radio portion 501 or handset portion 502 via driver 514. In block 526 the program determines whether or not any information needs to be transmitted on wires 517. If, no information needs to be transmitted on wires 517, the program waits in block 526. If, information needs to be transmitted on wires 517, the program proceeds to read from buffer block 527, where the program reads the information in the buffer. After reading the information, the program goes to block 528 in order to write the information on wires 517. Then, the program goes back to block 526 and waits for the transmission of information on wires 517.

FIGS. 3A to 3F is a flow chart of control logic 515. In block 552, cellular telephone 500 is initialized by the pressing of power switch 507. At this point the program goes to block 553 to read the descending register in vault 516. Then the program goes to store value in ram block 554 to store the contents of the descending register. Then, the program goes to update display block 555 to display the current value of the descending register or certain messages in display 498. The program proceeds to read ram block 556 and then to less than 5 call units remaining block 557. If, there is more than 5 call units remaining, the program goes to display remaining call units block 558 and the remaining call units are displayed on display 498. If, there are less than 5 call units remaining, the program goes to zero units remaining block 559. If, there are more than zero units remaining, the program goes to display warning messages block 560. A warning message like "Low funds (no. of units remaining)" may be displayed on display 498. The foregoing message may be accompanied by audio tones. If, there are zero call units remaining the program proceeds to display empty message block 674, whereupon a message like "No funds "Please Refill" may be displayed on display 498.

Figure 3A:
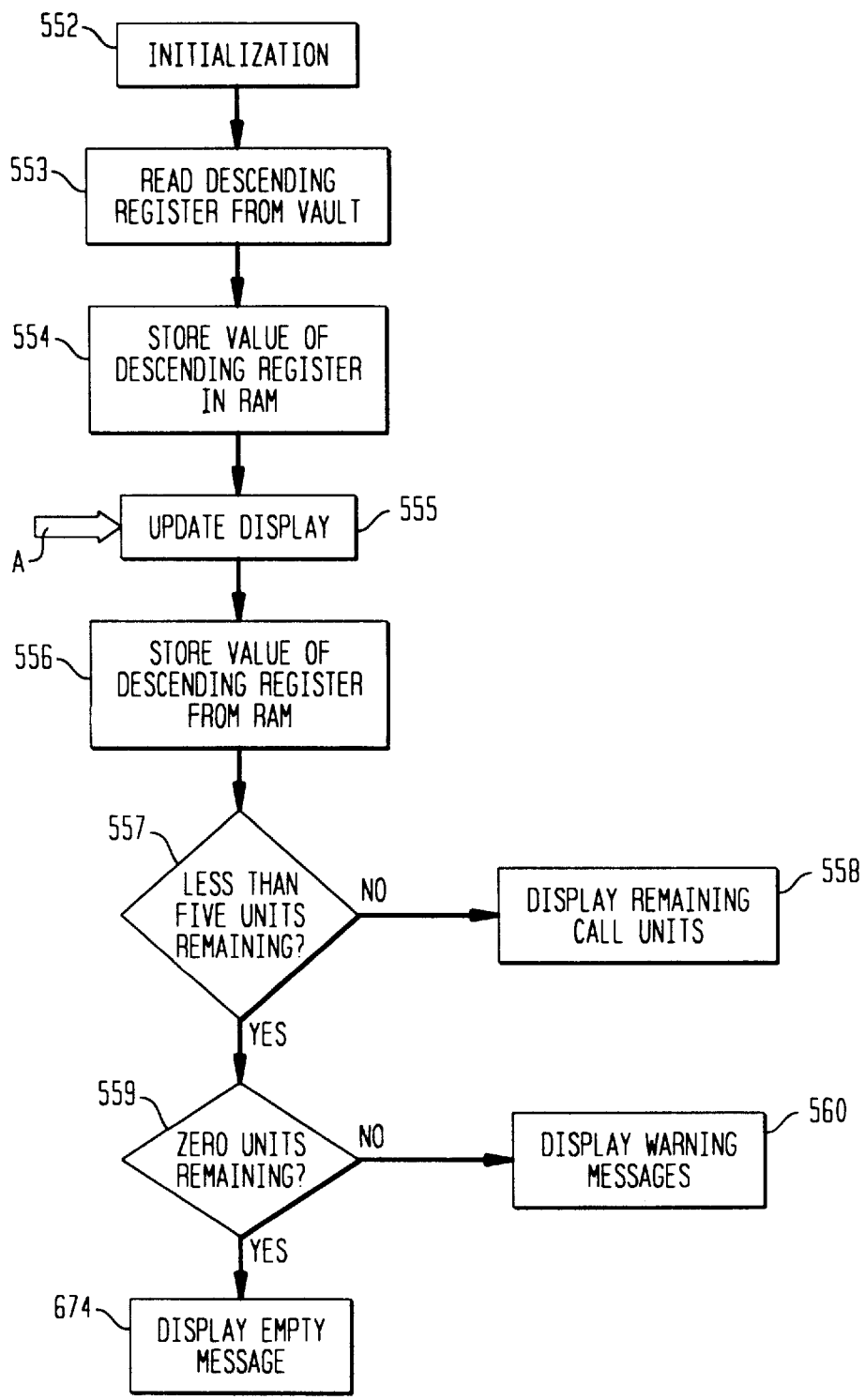
FIGS. 3A to 3F is a flow chart of control logic 515.
Figure 3B:
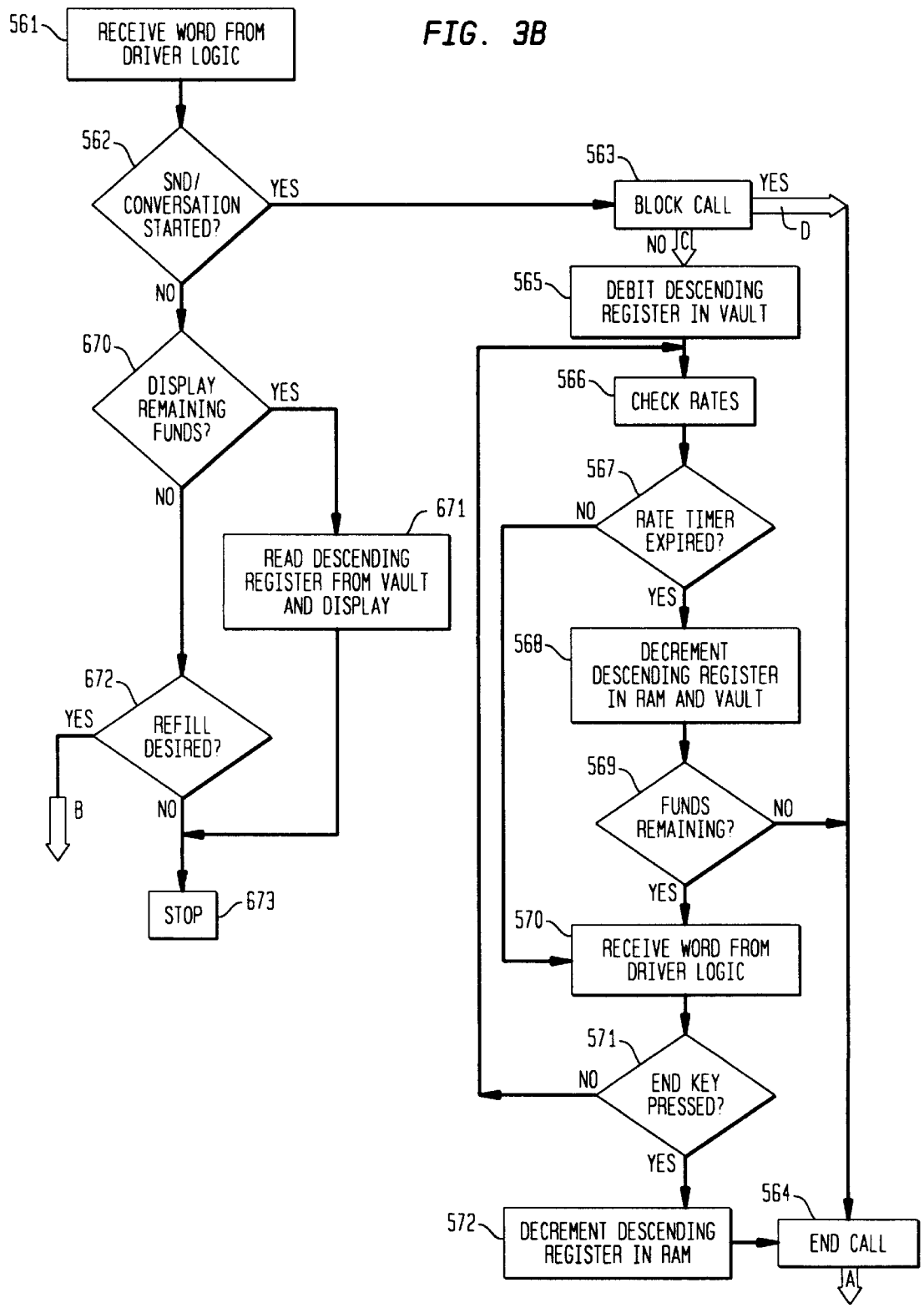

In FIG. 3B block 561 receives a word from block 525 of driver 514 (FIG. 2A). After receiving the sixteen bit word the program goes to send primary conversation mode block 562 to determine if a call is being initiated by cellular telephone 500. If, cellular telephone 500 is trying to initiate a call the program goes to block call 563. The block call subroutine block 563 will be more fully described in the description of FIG. 3C. If the call is to be blocked, the program goes to end call block 564 and then to A (FIG. 3A). End call 564 sends a command to radio portion 501 to terminate the call. The foregoing is accomplished by placing the command in a buffer that will be read by block 527 of driver 514, which is described in FIG. 2B. If the call is not blocked, the program goes to debit descending register in vault block 565. Now the program goes to check rates block 566 to determine the amount to debit the descending register in the vault, and determine the rates for the call and the time to start billing, e.g. long distance, roaming, free call, premium call, etc. Then, the program goes to rate timer expired block 567 to determine if it is time to debit the descending register in the vault. If, it is time to debit the descending register, the program goes to decrement descending register in ram and vault block 568 to decrement the descending register by the appropriate amount. Now, the program advances to funds remaining block 569 to determine if sufficient funds are remaining. If, sufficient funds are remaining the program goes to receive word from driver logic block 570 to receive a 16 bit word, if present from driver logic 514 (FIG. 1). Then, the program goes to end key pressed block 571 to determine if the 16 bit word indicates the cellular telephone user wants to end the telephone call. If, the user wants to end the call the program goes to decrement descending register in ram block 572, where the descending register is decremented by the appropriate amount. Note, that there are two descending registers, one in the vault and one in the ram. The descending register in the vault is non volatile and the descending register in the ram is volatile. The vault non volatile register is decremented at the beginning of the call and during the call and not at the end of the call. The ram volatile register is decremented during the call and at the end of the call but not at the beginning of the call. The foregoing is done to properly reflect the amount spent for the call in case of a power loss. After the descending register in ram was decrement, the program would go to end call block 564.

If, no funds were remaining in block 569, the program would also go to end call block 564. If the end key was not pressed in block 571, the program would return to check rate block 566. If the rate timer block 567 did not expire, the program would advance to receive word from digital logic block 570.

If in block 562, the send/conversation was not started, the program would go to display remaining funds block 674, where the cellular telephone user can decide to have the remaining funds displayed on display 498 (FIG. 1) by pressing a key on keypad 506 (FIG. 1). If the user wants to display the remaining funds, the program goes to read descending register from vault and display block 671 to display the remaining funds. If, the user did not want to display the remaining funds, the program would go to refill desired block 672. If a refill was not desired, the program would go to stop block 673. If, a refill was desired, the program would go to FIG. 3D.

Figure 3C:
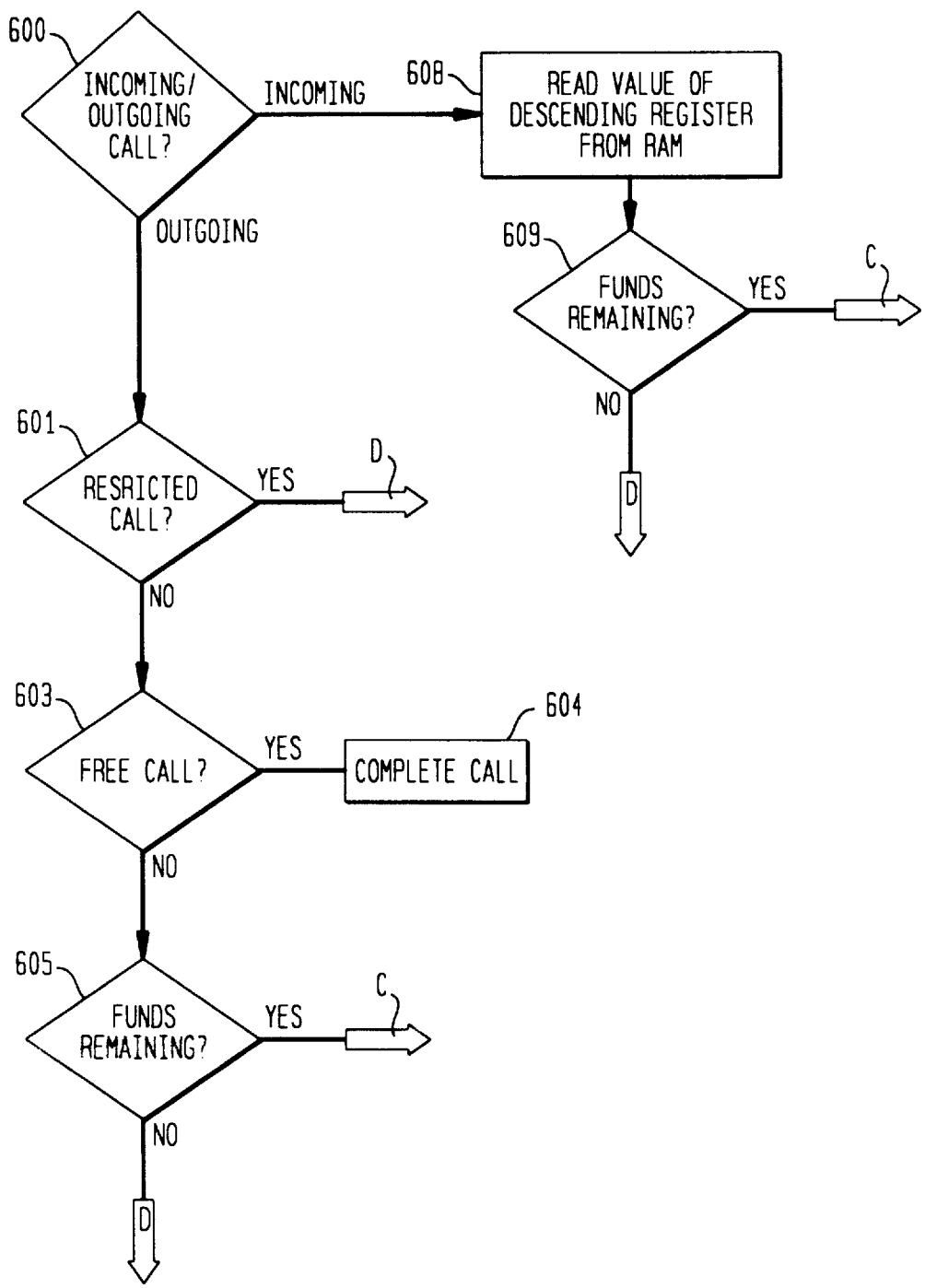
Figure 3D:
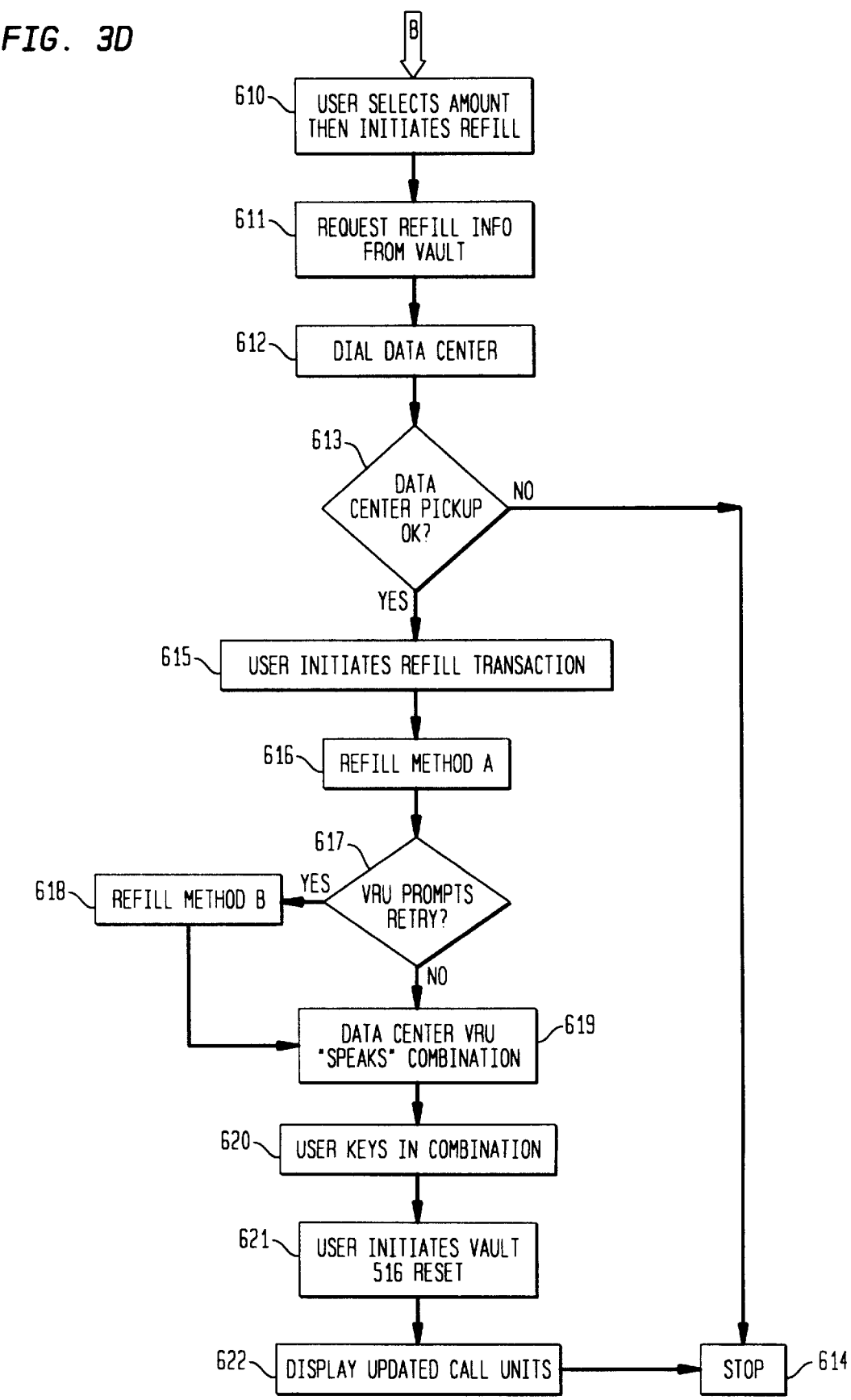

If the output of refill desired block 672 of FIG. 3B was yes, then the program would proceed to user selects amount then initiates refill block 610 (FIG. 3D). In block 610 the user would decide the amount of the refill. Then, the program would go to request refill information from vault block 611, where the program would obtain the access code from vault 516 (FIG. 1). The process of dialing out will place a command in the buffer that will be read in block 527 of driver 514 for output to radio 501. At this point the program would proceed to dial data center block 612 and the data center 510 telephone number would be dialed (FIG. 1). Then the program would go to data center pickup ok block 613. If, VRU 499 located in the data center does not pick up, the program would go to stop block 614. If, VRU 499 picks up or answers, the program would go to user initiates refill transaction block 615, where VRU 499 would ask the cellular telephone user to press a key on keyboard 506 (FIG. 1) to initiate a refill, after a key was pressed, the program would proceed to refill Method A block 616. The Refill Method A flow chart is described in the description of FIG. 3E. Upon completion of the above subroutine, the program would proceed to VRU prompts retry block 617, where VRU 499 may ask the cellular telephone user to retry the refill attempt. If, the user decides to retry the refill attempt, the program goes to refill Method B block 618. The Refill Method B is described in FIG. 3F.

Upon completion of the subroutine in block 618 or block 617 and having a negative response, the program would proceed to data center VRU speaks combination block 619, where the caller listens to the instructions of VRU 499 (FIG. 1). Then, the program would proceed to user keys in combination block 620, where the cellular telephone caller would key in the combination instructed by VRU 499 on keypad 506. After, the combination was entered, the program would proceed to customer initiates vault 516 reset block 621 where the user of cellular telephone 3 would press a key on keypad 506 to initiate the reset. Then, the program would go to display updated call units block 622, where the remaining call units or funds would be displayed on display 498 (FIG. 1).

Figure 3E:
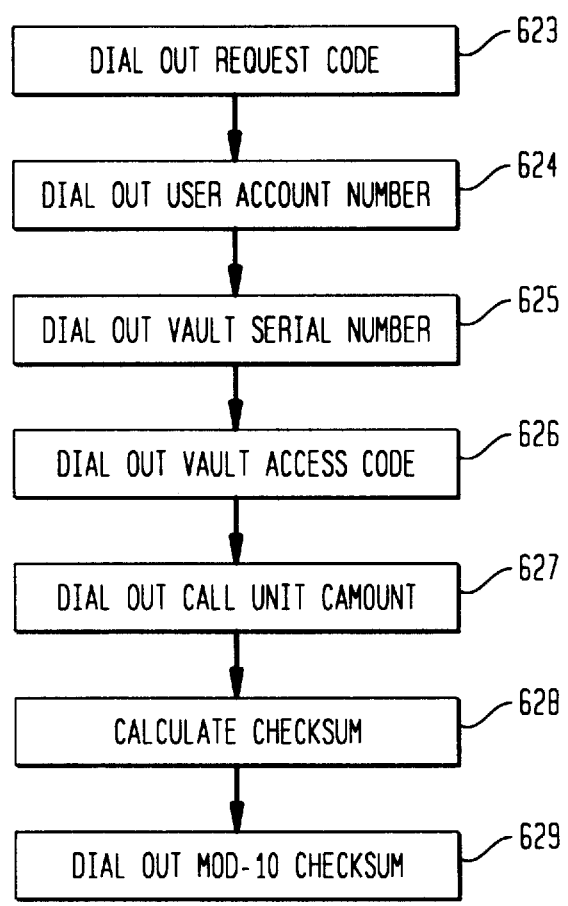

FIG. 3E is a flow chart of refill Method A. In block 623, a 3 digit request code is used to tell computer 511 the user's desire to refill vault 516. At this point, the program goes to dial out account no. block 624 where computer 511 is given a 10 digit user's account number. Now, the program goes to dial vault serial number block 625 where computer 511 is sent the serial number of vault 516. Then, the program goes to dial out vault access code block 626 where computer 511 is given the access code of vault 516. Then, the program goes to dial out amount block 627, where computer 511 is given the amount of the refill. Now the program goes to calculate check sum block 628 where computer 511 calculates the modular 10 check sum by adding each digit of blocks 623–627. The check sum is the value needed to raise the sum of the digits in blocks 623–627 to the next value devisable by 10. Now, the program goes to dial MOD-10 checksum 629 where computer 511 is sent the value determined in block 628.

As an example of the above is if the request code in block 623 was 111, the account number in block 624 was 19312321, the vault serial number in block 625 was 1306553, the access code in block 626 was 123456 and the amount was $20.00 in block 627 the sum would be 71 and the checksum would be 9 and 80 would be the next number divisible by 10.

Figure 3F:
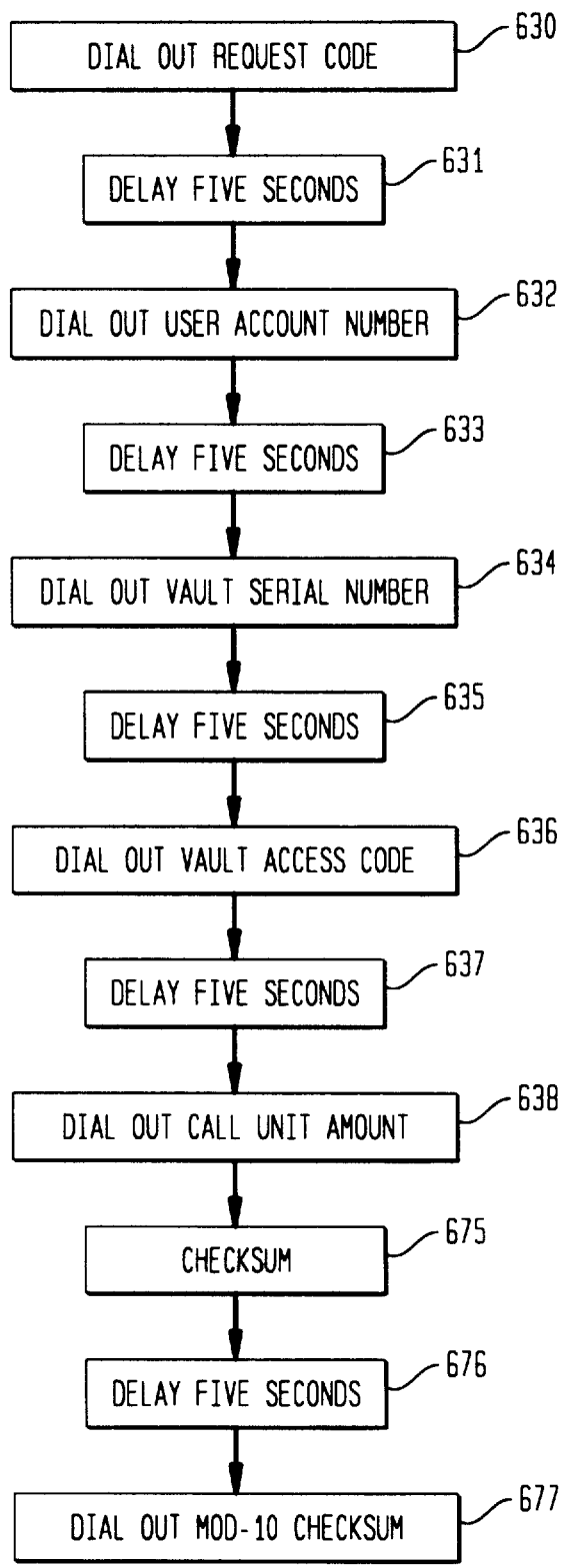

FIG. 3F is a flow chart of refill Method B. In dial out block 630 a three digit request code is used to tell computer 511 the users desire to refill vault 516. The program now waits for 5 seconds in block 631. The program advances to dial out account number block 632 where computer 511 is given a 10 digit users account number. At this point the program waits in block 633 for 5 seconds and then proceeds to dial out vault serial number block 634, where computer 511 is given the serial number of vault 516. The program then waits in block 635 for 5 seconds and then advances to dial out vault access code block 636, where computer 511 is given the access code of vault 516. Then, the program waits in block 637 for 5 seconds before advancing to dial out amount block 638, where computer 511 is given the amount of the refill. Then the program goes to checksum block 675. Now, the program goes to delay block 676 and waits for 5 seconds. At this point the program goes to dial out Mod-10 checksum block 677. Refill Method B is used instead of Refill Method A when it is difficult to transmit information, e.g., the caller experiences bad line condition and it is difficult to transmit information from cellular telephone 500 to VRU 499.

FIG. 3C is a flow chart of the block call subroutine block 563 of FIG. 3B. When a telephone call is being initiated or accepted by cellular telephone 500, the subroutine in block 563 will be run. Block 600 determines if the cellular telephone 500 phone call is incoming or outgoing. If, the call is outgoing the program proceeds to restricted call block 601. If, the phone call is a restricted call (a 900 number or international call was dialed) the program goes to end call block 564, FIG. 3B, where the call is ended. If, the call is not restricted, the program advances to free call block 603. If, a free call (911 was dialed) the program advances to complete call block 604. If, a free call was not made the program proceeds to funds remaining block 605. If, sufficient funds are available, the program endeavors to complete the call and proceeds to debit descending register in vault block 565, FIG. 3B. If, sufficient funds are not available, the program goes to end call block 564, FIG. 3B.

If, block 600 determines that the phone call is an incoming telephone call, the program would proceed to read value of descending register from ram block 608 and then to funds remaining 609. If, sufficient funds are remaining, the program would proceed to debit descending register block 565, FIG. 3B. If, sufficient funds are not remaining, the program would proceed to end call block 564, FIG. 3B.

Figure 4A:
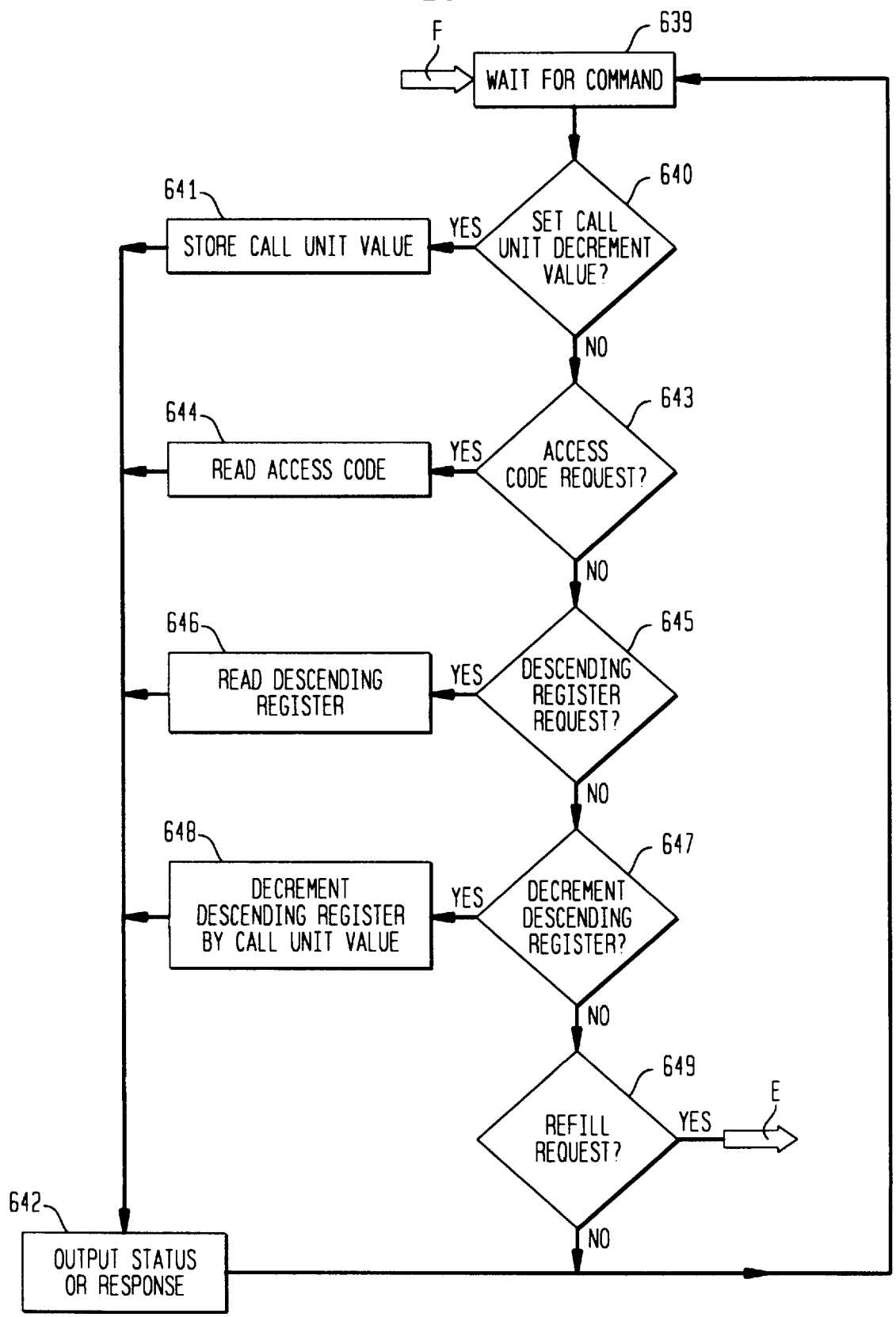
FIGS. 4A and 4B is a flow chart of vault 516.
Figure 4B:
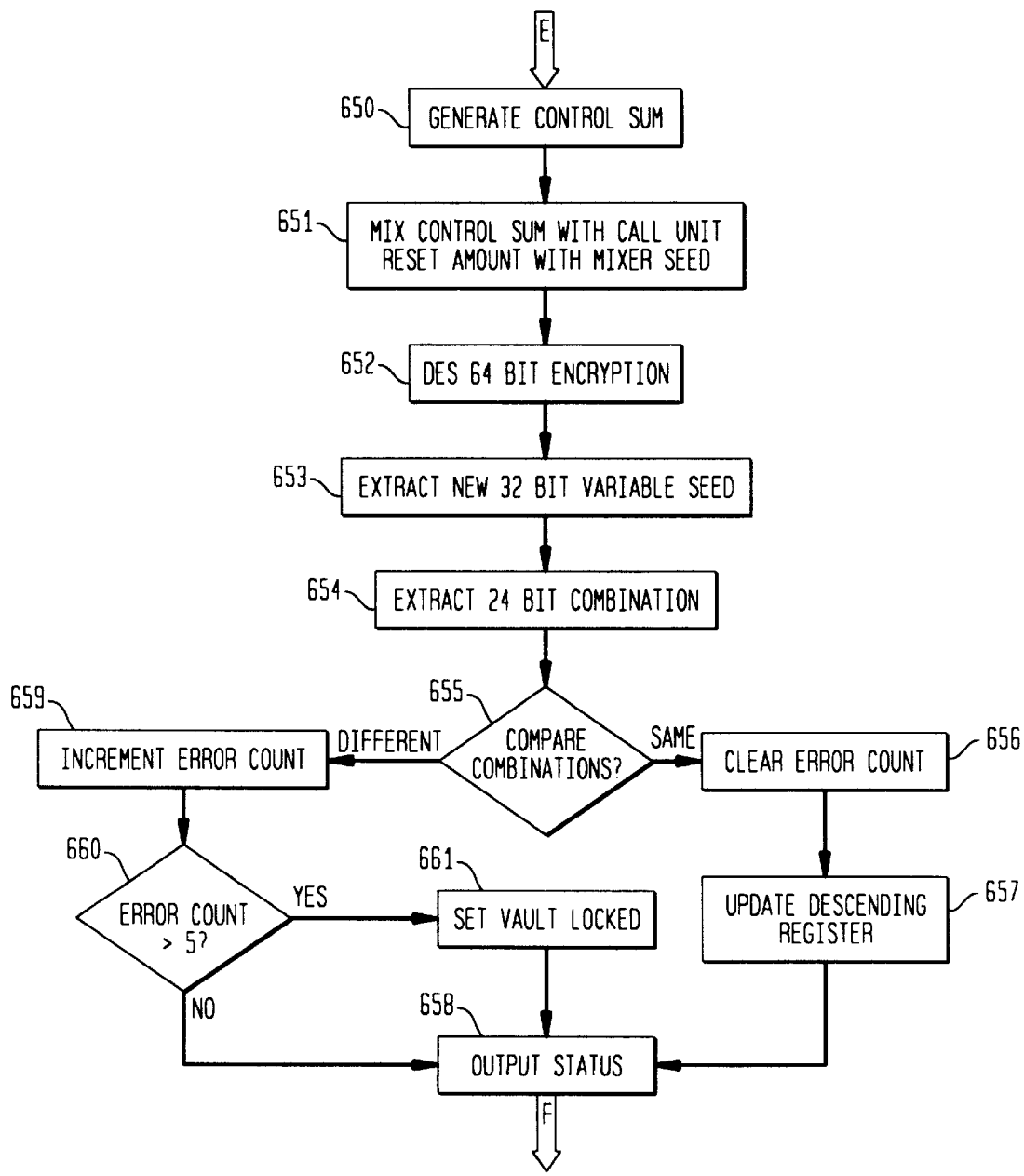

FIGS. 4A and 4B are a flow chart of vault 516. The program begins at wait for command block 639, where a command and certain parameters are retrieved from control logic 515. After receiving a command the program proceeds to set call unit decrement value block 640. If, the command was to set the call unit decrement value, the program would go to store call unit value block 641, where the call unit decrement value would be stored. At this point, the program would advance to output status or response block 642 where an indication of the success or failure of the operation in block 641 is obtained, the data in block 641 would be sent to control logic 515 and the program would process to wait for command in block 639. If, the command was not to set call unit decrement value the program would proceed to access code request block 643. When the command is to request an access code, the program would advance to read access code block 644, where an access code is generated. The access code is generated by taking the part of the control sum value of vault 516 and together with the reset count applying the resulting value to a cyclic redundancy check generation process to obtain the access code. Now, the program goes to output status or response block 642, where a indication of the success or failure of the operation in block 694 is obtained, the data in block 644 would be sent to control logic 515 and the program would proceed to wait for command in block 639.

If, the next command was not set call unit decrement value, an access code request, the program would go to descending register request block 645. If, the command was a descending register request, the program would advance to read descending register block 646, where the program would read the contents of the descending register in vault 516. Then the program would go to output status of response block 642, where a status indicating the success or failure of the operation in block 646 is obtained, the data in block 646 would be sent to control logic 515 and the program would go to wait for command block 639.

If the next command was not set call unit decrement value, access code request, descending register request, the program would advance to decrement descending register block 647. If the program wanted to decrement the descending logic at this time, the program would go to decrement descending register by call unit value block 648, where the descending register in vault 516 would be decremented by the call unit value that was last stored in block 641, and the ascending register in vault 516 would be incremented by the above value. Now the program would go to output or status response block 642 where a status indicating the success or failure of the operation in block 648 is obtained, the data in block 648 would be sent to control logic 515 and the program would proceed to wait for command block 639.

If the command was not to set call unit value, an access code request a descending register request, a decrement descending register, the program would advance to refill request 649. If the command was to refill the vault, the program would go to generate control sum block 650 FIG. 4B. If the command was not a refill request, the program would go to wait for command block 639 and wait for the next command.

In block 650 (FIG. 4B) the program would add the current value of the ascending register in vault 516, to the current value of the descending register in vault 516 to obtain a control sum. Now the program would go to mix control sum with call unit reset amount with mixer seed block 651. The control sum would be mixed with the call unit reset amount obtained from block 639, and with a mixer seed. The mixer seed is a random number that has been previously placed into vault 516. At this time, the program advances to DES 64 bit encryption where the 64 bit output of block 651 is encrypted using a 32 bit fixed and a 32 bit variable seed. DES is known as the Data Encryption Standards and is described in FIPS PUB 46, dated Jan. 15,1977, published by the United States Department Of Commerce, National Bureau of Standards, herein incorporated by reference. It will be obvious to one skilled in the art that different types of public and private encryption may be utilized.

At this time, the program advances to extract new 32 bit variable seed in block 653, where the 32 bit output of block 652 becomes the new seed. Now, the program goes to extract 24 bit combination block 654, where the program takes 24 bits of the output of block 652 and converts this output to octal, which is the calculated combination. Thirty two bits of the output of block 652 are used to generate the variable, seed in block 653 and 24 bits of the output of block 652 are used to extract a 24 bit combination in block 654 and the remaining 8 bits of the output of block 652 are discarded. The 24 bit combination is used as a password.

Now, the program goes to compare combination block 655, where the combination calculated in block 654 is compared with the combination obtained from block 639. If, the above combinations are the same, the program would go to clear error count block 656, which resets the number of consecutive bad refill attempts to refill cellular telephone 500 to zero. Then the program goes to update descending register block 657 where the descending register in vault 516 is incremented by the call unit reset amount obtained from block 639.

At this point, the program proceeds to output status block 658, where a successful status indication is transmitted to control logic 515, and the program proceeds to wait for command in block 639. If the combinations in block 655 were different, the program would go to increment error count block 659. The error count is the number of times an unsuccessful attempt has been made to refill cellular telephone 500. Now, the error count would be incremented by one and the program would go to error count >5 block 660. If, the error count is greater than 5, the program would go to set vault locked block 661, where a flag would be set preventing further refilling of vault 516. Now the program would go to output status block 658 where a lock indication would be transmitted to control logic 515 and the program proceeds to wait for command in block 639. Vault 516 would be unable to be refilled until the cellular telephone user communicated with data center 510 and data center 510 determined there was no fraud. Then, the data center would issue a combination that would unlock vault 516.

If the error count in block 660 is not greater than 5, the program would go to output status block 658, where a unsuccessful refill attempt indication is transmitted to control logic 515 and the program proceeds to wait for command in block 639.

Figure 5:
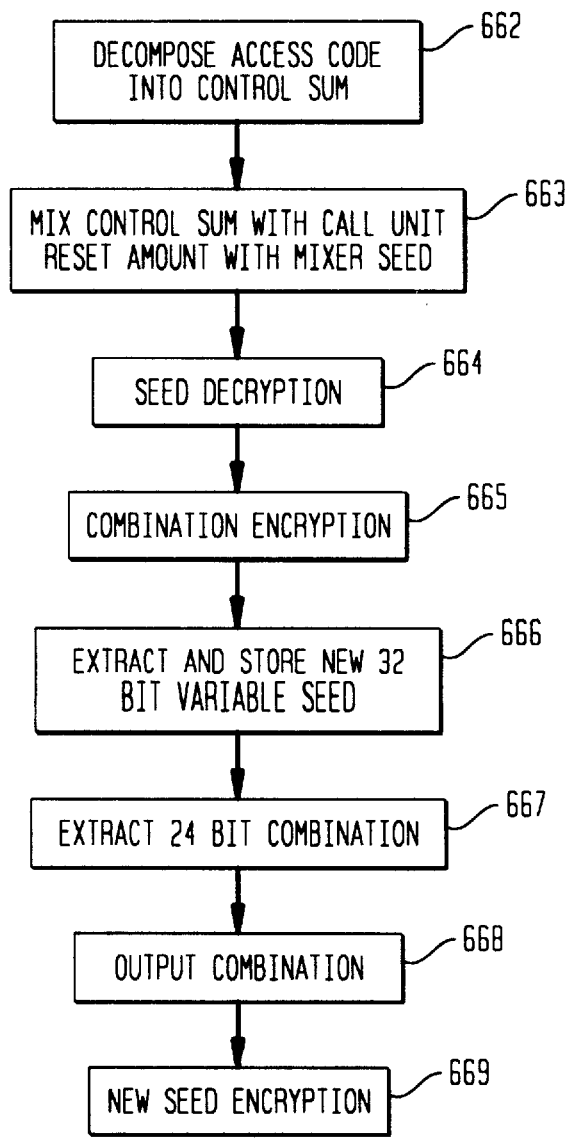
FIG. 5 is a flow chart of vault 512.

FIG. 5 is a flow chart of vault 512. The program starts at decompose access code into control sum block 662. The access code was obtained from vault 516 via antennas 503 and 509 VRU 499, and computer 511. Then the access code is decomposed by splitting the access code into a cyclical redundancy check component and a control sum component. Then, the program advance to mix control sum with call unit reset amount with mixer seed block 663. The control sum obtained in block 662 is mixed with the call unit reset amount entered by the cellular telephone 500 user via VRU 499, and the mixer seed which is a randomly generated seed that is common to vault 512 and 516.

At this point, the program advances to seed decryption block 664 where the 32 bit hidden fixed and 32 bit hidden variable seeds which reside in computer 511 are decrypted using DES. The program now goes to combination encryption block 665 where the results from block 664 are DES encrypted with the results of block 663. Then the program goes to extract and store new 32 bit variable seed 666, where the 32 bit portion of the 64 bit result of block 665 becomes the new variable seed. The program now goes to extract 24 bit combination 667 where a 24 bit portion of the 64 bit result from block 665 is converted to octal and is the new combination. Then, the program advances to output combination block 668, where vault 512 outputs the combination obtained in block 667 to computer 511 which relays it to user of cellular phone 500 via VRU 499 and antennas 509 and 503. Then, the program goes to new seed encryption block 669 where the new 32 bit variable seed in block 666 and the 32 bit fixed seed are encrypted before being stored in computer 511.

The above specification describes a new and improved cellular telecommunications systems that utilizes prepayment for access. It is realized that the above description may indicate to those skilled in the art additional ways in which the principles of this invention may be used without departing from the spirit. It is, therefore, intended that this invention be limited only by the scope of the appended claims.

What is claimed is:

1. A system for metering cellular telephone usage and connecting one or more cellular telephones to a telephone network, said system comprising:

a plurality of cellular telephones having a first processor having a program that resides therein that contains information that represents funds or call units that have been placed in said first processor so that the funds or call units are removed from said first processor when calls are made and added to said first processor when funds are added; wherein said first processor includes:

a first descending register in said first processors, said first descending register increases in value when funds or call units are added to said first processor and decreases in value when calls are made on said cellular telephone;

a first ascending register that increases in value when calls are made on said cellular telephone;

a first control sum which verifies that the contents of said first ascending register and the contents of said first descending register remain constant until additional funds or call units are added to said first processor;

a telephone exchange that is coupled to a data center having a second processor having a program that resides therein that represents funds or call units that have been placed in or removed from said first processor, wherein said second processor includes;

a second descending register that increases in value when funds or call units are added to said second processor and decreases in value when calls are made on said cellular telephone;

a second ascending register that increases in value when calls are made on said cellular telephone; and a second control sum which verifies that the contents of said second ascending register and the contents of said second descending register remain constant until additional funds or call units are added to said second processor;.

means for adding additional funds or call units to the cellular telephone and data center; wherein said means for adding additional funds or call units comprises:

a voice response unit located in said data center; and means located in the cellular telephone responsive to said voice unit for the user to enter information requested by said voice unit and the amount of additional funds or call units the user wants to be added, means coupled to said voice response unit for generating one or more codes that allows funds or call units requested by the telephone user to be added in order to make additional phone calls;

means coupled to said voice response unit for generating an access code that allows funds or units requested by the telephone user to be added in order to make additional phone calls, wherein said means for generating an access code comprises:

means located in the cellular telephone for generating a control sum;

means located in the cellular telephone for determining the number of times funds or call units were added to the cellular telephone;

means for summing the control sum and the number of times funds or call units were added to the cellular telephone;

means for calculating a cyclical redundancy code of the control sum and the number of times funds or call units were added to the cellular telephone; and means for summing the control sum, the number of times funds or call units were added to the cellular telephone, and the cyclical redundancy code of the control sum and the number of times funds or call units were added to the cellular telephone to obtain the access code, whereby said cellular telephones are connected to the network if sufficient funds are present in said first processor.

2. The system claimed in claim 1, further including:

a display on said cellular telephone that indicates the remaining number of funds or call units stored in said first processor.

3. The system claimed in claim 1, further including:

means for generating a first password and a second password.

4. The system claimed in claim 3, wherein said means for generating a first and second password comprises:

means located in the cellular telephone for placing a seed in the cellular telephone;

means located in the data center for placing the seed in the data center;

means located in the cellular telephone for determining the value of the seed, said first control sum and the amount of funds or units added by the user;

means coupled to said determining means for forming a first password;

means located in the data center for determining the value of the seed, said second control sum and the amount of funds or units added by the user; and means coupled to said determining means for forming a second password.

5. The system claimed in claim 4, further including:

means for determining that said first and second passwords are equal, whereby the amount of funds or units requested to be added to the phone by the user will be added.

6. The system claimed in claim 4, further including:

means for generating a new seed; and means for utilizing the new seed the next time the user wants to add additional funds or call units to the cellular telephone.

7. A method for metering cellular telephone usage and connecting one or more cellular telephones to a telephone network, said method comprising the steps of:

a. storing the number of funds or calls units available to make a call in a cellular telephone;

b. storing the number of funds or call units available to make a call in a data center;

c. connecting the cellular telephone to the network if sufficient funds are available in step a;

d. removing funds or call units, while telephone calls are made;

e. accumulating the amount of funds or call units removed in step d in the cellular telephone;

f. disconnecting the cellular telephone from the network if sufficient funds are not available;

g. adding additional funds or call units that the cellular telephone user wants to add to the cellular telephone; and h. encrypting the data that is used to add the additional funds or call units;

wherein the encrypting step further including the step of:

obtaining a control sum that represents the number of funds or call units stored in step a and accumulating this amount in the cellular telephone and data center;

utilizing a hidden seed in the cellular telephone and the amount of additional funds the user wants added to obtain a new seed and a first code;

obtaining a control sum that represents the number of units stored in the data center and accumulating this amount in step d;

utilizing a hidden seed in the data center and the amount of additional funds the user wants added to obtain a new seed and a second code; and determining if the first and second codes are the same.

8. The method claimed in claim 7, wherein the step e) of: accumulating the amount of funds or call units removed in step d is in the cellular telephone and in the data center.

9. The method claimed in claim 7, further including the step of:

adding additional funds or call units that the cellular telephone user wants to add to the cellular telephone and data center.

10. The method claimed in claim 7, further including the step of:

utilizing the new seed the next time the user wants to add additional funds or call units to the cellular telephone.

* * * * *